2,950,305
PREPARATION OF ORGANOMERCURY COMPOUNDS

James M. Riddle, Baton Rouge, La., assignor to Ethyl Corporation, New York, N.Y., a corporation of Delaware No Drawing. Filed May 1, 1959, Ser. No. 810,238

5 Claims. (Cl. 260—431)

The present invention is concerned with a process for the production of organomercury compounds, particularly dialkylmercury compounds.

There are numerous methods reported in the literature for the preparation of organomercury compounds. Without attempting to mention all such processes, the following are typical: mercury has been reacted with alkyl halides to form alkylmercury halides; sodium amalgam has been reacted with alkyl halides to form dialkylmercury compounds; and certain mercury halides have been reacted with certain organometallic compounds, e.g. the Grignard reagent, to form the dialkylmercury compounds. All of the presently known procedures are primarily of academic interest and suffer particular disadvantages. So far as now known, a simple and convenient method for the preparation of dialkylmercury compounds, readily adaptable to commercial operation, has not been available.

The alkylmercury compounds are of considerable utility. For example, they are useful as intermediates for forming other organometallic compounds, a typical reaction being that of diethylmercury with sodium metal to form ethylsodium. Another use for the mercury compounds, and derivatives thereof, is in agricultural chemical applications. Still other uses are known and a more practical method for their preparation is desirable to further amplify the utility of these compounds.

Accordingly, an object of this invention is to provide a new and novel process for the production of organomercury compounds. A further object is to provide a process whereby greater and more economical yields of organomercury compounds are obtained. A particular object is to provide a new and novel process for the manufacture of dialkylmercury compounds. These and other objects will be apparent as the discussion proceeds.

The above and other objects of this invention are accomplished by reacting a trialkyl- or trialkenylborane with a mercury halide in an aqueous medium. Mercuric chloride is the preferred mercury halide and the lower trialkylboranes, especially triethylborane, are the preferred organoborane compounds. While the process is adaptable to operation at varying temperature, particular advantage is achieved when the reaction is conducted at a temperature between about 20 to 100° C. Still further advantage is achieved when the reaction is conducted in the presence of at least a minor amount of a hydroxide, particularly sodium hydroxide, and when sufficient water is employed to result in a completely fluid, homogeneous system. Thus, one embodiment of this invention comprises the reaction of mercuric chloride with triethylborane at a temperature between about 20 to 100° C. in the presence of water. A still more preferred embodiment of the invention comprises reacting mercuric chloride with triethylborane at a temperature between about 20 to 100° C. in the presence of sufficient water to provide a homogeneous reaction system and in the further presence of a minor amount of sodium hydroxide.

The present invention is a particular advantage over the prior art methods for producing organomercury compounds in that high yields are obtained employing less stringent conditions. For example, the process provides essentially quantitative yields of the desired organomercury product employing materials which are not sensitive to water and are less hazardous to handle. Another advantage is that a completely liquid reaction system wherein all reactants are miscible is obtained. A still further advantage is that the product is readily recoverable from the reaction system since in most cases it is more dense and immiscible dropping to the bottom of the reaction mixture. These and other advantages will be evident as the discussion proceeds.

The mercury halide can be, in general, any mercury halide including those of the mercuric and mercurous valence states. Typical examples of such halides are mercuric chloride, bromide, and iodide, and the analogous mercurous halides, as, for example, mercurous chloride and the like. The mercuric halides are preferred over the mercurous halides because of their greater availability and solubility in the reaction system. Thus, halides of mercury which are completely miscible in water under the reaction conditions are particularly advantageous with mercuric chloride being especially preferred.

The organoborane compounds employed in the process are the trialkyl- or trialkenyl boranes. In general, such compounds will contain up to and including about 18 carbon atoms in each hydrocarbon portion. Illustrative examples of the alkyl- and alkenylboranes are trimethylborane, triethylborane, tripropylborane, trihexylborane, trioctylborane, tridecylborane, tridodecylborane, trioctadecylborane, trivinylborane, tri-1-propenylborane, tri-2-butenylborane, tri-1-hexenylborane, tri-1-octenylborane, tri-1-octadecenylborane, tri-2,4-octadecadienylborane and the like. It is to be understood that the hydrocarbon portions of such compounds can be branched chain and further substituted with functional groups which are essentially inert in the reaction, such as the halogens, carbonyl and the like functions. The trialkyl- and trialkenylboranes of the lower alkyl and alkenyl radicals, that is, having up to and including about 8 carbon atoms in each of such groups, are preferred because of their greater availability and reactivity in the process. The trialkylboranes having up to and including about 8 carbon atoms in each alkyl group are more especially preferred, particularly triethylborane, because of their easier handling and greater availability.

The proportions of the reactants can be varied over a considerable range to still result in the desired organomercury compound. It is preferable, however, to employ at least the stoichiometric amount of the alkyl- or alkenylborane compound. Advantage is achieved in higher yields and faster reaction rates when a molar excess between about 5 to 15 percent of the alkyl- or alkenylborane is employed. In determining the stoichiometry, one can base it upon the consumption of one or all of the alkyl or alkenyl groups in the trialkyl- and trialkenylboranes. Since faster reaction is obtained of the first alkyl or alkenyl group of the organoborane compound, a particular embodiment of the invention comprises employing the above stoichiometric portions based upon reaction of only one alkyl group per molecule of the alkyl- or alkenylborane. The water employed in the system is usually provided in amount to result in a fluid reaction mixture. It is also desirable to employ at least 3 moles of water per mole of the trialkyl- or trialkenylborane. In a preferred embodiment, between about 5 to 200 moles of water per mole of the alkyl- or alkenylborane is employed.

The process is subject to relatively simple manipulative operations. In general, the requisite amounts of organoborane compound and water are added to a reactor and then the mercury halide is added thereto. The reverse mode of addition is equally applicable although higher yields are obtained when adding the halide to the organoborane. The mixture is then agitated to facilitate contact of the reactants. During the addition and reaction, an inert atmosphere is preferably employed because of the flammability of the organoborane compound. The mixture is reacted at the desired temperature and then, or during the course of the reaction, the product can be withdrawn in essentially pure form from the bottom of the reactor, in those instances wherein the product is of appropriate specific gravity, or, alternatively, the product is readily distillable from the reaction mixture in pure form. It is to be understood that other variations in the process can be made without departing from the purposes of the present invention.

The process will be more completely understood from a consideration of the following examples wherein all parts are by weight unless otherwise specified.

Example I

To a reactor equipped with internal agitation, external heating means, a reflux condenser, and a means for admitting and discharging reactants and products, is added 105 parts of triethylborane, 100 parts of water, and agitation is commenced while maintaining a nitrogen atmosphere in the system. Then 136 parts of mercuric chloride, dissolved in 2500 parts of water, are added to the mixture over a period of 20 minutes. At the end of the addition period, agitation is stopped and two layers form. The lower, heavier layer is withdrawn from the reactor by gravity and comprises essentially pure diethylmercury in high yield.

Example II

The procedure of Example I is followed with exception that prior to the addition of the mercuric chloride, 2 parts of sodium hydroxide are added to the reactor and the reaction mixture is heated to 50° C. Upon completion of addition of the mercuric chloride, the agitation is stopped to withdraw the diethylmercury from the bottom of the reactor. Employing this procedure, an essentially quantitative yield of diethylmercury is obtained.

Example III

When trivinylborane is substituted for triethylborane, and potassium hydroxide is substituted for sodium hydroxide in Example II, divinylmercury is obtained in high yield.

Example IV

When 41 parts of trioctylborane are reacted with 28 parts of mercuric bromide in the presence of 500 parts of water and 2 parts of lithium hydroxide, dioctylmercury can be continuously withdrawn from the reactor in good yield.

Example V

When 143 parts or tri-1-hexenylborane in 150 parts of water, and containing 1 part of magnesium hydroxide are added to the reactor of Example I, and this mixture heated to 75° C. with agitation, and then 181.5 parts of mercuric iodochloride suspended in 1000 parts of water maintained at 75° C., are added to the reactor over a period of 45 minutes, di-1-hexenylmercury is produced in high yield.

Example VI

The procedure of Example II is repeated with exception that 8.3 parts of tri-1-octadecenylborane are reacted with 1.36 parts of mercuric chloride in the presence of 100 parts of water at 50° C. for 1 hour, di-1-octadecenylmercury is obtained in high yield.

Example VII

Employing the procedure of Example VI with exception that trioctadecylborane is substituted for trioctadecenylborane, dioctadecylmercury is obtained in high yield.

The above examples are presented by way of illustration and the invention is not intended to be limited thereby. It will be evident that other organoborane compounds described hereinbefore can be substituted to produce similar results.

As indicated, advantage is achieved by incorporating a base in the reaction mixture. The incorporation of such materials in the reaction mixture consistently results in a further enhancement in yield and more effective separation of the product. For this purpose the alkali and alkaline earth hydroxides are quite well suited as, for example, sodium hydroxide, potassium hydroxide, lithium hydroxide, magnesium hydroxide, calcium hydroxide, strontium hydroxide, and the like. The hydroxide need be added only in minor amount to result in a slight basicity of the reaction mixture. Generally, such materials are preferably added in amount between about 0.1 to 3 moles of hydroxide ion per mole of the mercury halide.

The temperature at which the reaction is conducted is subject to considerable latitude, but generally is between about 0° C. to the decomposition temperature of the reactants or products. For practical reasons, the reaction is ordinarily conducted at between about 0 to 100° C. Best results are obtained, however, when the temperature is maintained between 20 to 100° C. There is no need to employ pressure in the operation unless one desires to conduct the reaction at a temperature above the boiling point of the reaction mixture. Reduced pressures can be employed if it is desired to steam distill the product from the reaction mixture as, for example, when it is lower boiling than the organoborane reactant.

The reaction is generally instantaneous so that time is not a critical factor. That is, the reaction is essentially complete upon completion of addition of the mercury halide to the alkyl- or alkenylborane or vice versa. The time of addition can vary from between about 5 minutes to 2 hours or longer, although addition periods of about 30 minutes are usually quite adequate. Because of the instantaneous reactivity and the ready removal of the product from the reaction system, the process is readily adaptable for continuous operation. For example, one such operation would be the co-mingling of the mercuric halide with a stream of the trialkyl- or trialkenylborane, water, and hydroxide, if employed, with continuous separation of the organomercury product from the system.

Having thus described the process of this invention, it is not intended that it be limited except as set forth in the following claims:

I claim:
1. The process for the manufacture of organomercury compounds which comprises reacting an organoborane compound selected from the group consisting of trialkylborane and trialkenylborane with a mercury halide in the presence of water.
2. A process for the manufacture of diethylmercury which comprises reacting triethylborane with mercuric chloride in the presence of water and in the further presence of a minor amount of sodium hydroxide at a temperature between about 20 to 100° C.
3. Process of claim 1 wherein said organoborane compound is a trialkylborane and said process is conducted at a temperature between about 20 to 100° C.
4. The process of claim 3 further characterized in that said mercury halide is mercuric chloride.
5. The process of claim 4 further characterized in that the reaction is conducted in the presence of a hydroxide selected from the group consisting of alkali and alkaline earth metal hydroxides.

References Cited in the file of this patent

Chemical Reviews, vol. 54, October 1954, pp. 875 to 890.